(12) United States Patent
Yui et al.

(10) Patent No.: US 8,465,827 B2
(45) Date of Patent: Jun. 18, 2013

(54) GLASS SUBSTRATE FOR DISPLAY AND METHOD FOR MANUFACTURING THE GLASS SUBSTRATE

(75) Inventors: Kazuhiko Yui, Tokyo (JP); Kentaro Tatsukoshi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/455,798

(22) Filed: Apr. 25, 2012

(65) Prior Publication Data

US 2012/0207980 A1      Aug. 16, 2012

Related U.S. Application Data

(63) Continuation of application No. PCT/JP2010/068641, filed on Oct. 21, 2010.

(30) Foreign Application Priority Data

Oct. 26, 2009  (JP) .................................. 2009-245938
Mar. 1, 2010   (JP) .................................. 2010-044515

(51) Int. Cl.
    *B32B 3/02*     (2006.01)
    *B32B 23/02*    (2006.01)

(52) U.S. Cl.
     USPC .......................................... 428/157; 428/192

(58) Field of Classification Search
     USPC ................ 428/156, 192, 157, 426; 65/66, 93, 65/94, 90
     See application file for complete search history.

(56) References Cited

U.S. PATENT DOCUMENTS 7,059,154 B1    6/2006    Quentin et al.

FOREIGN PATENT DOCUMENTS

| JP | 07-001569 | 1/1995 |
| JP | 07-010569 | 1/1995 |
| JP | 2002-544104 | 12/2002 |
| JP | 2004-087382 | 3/2004 |
| JP | 2004087382 A * | 3/2004 |
| JP | 2007-301495 | 11/2007 |
| JP | 2009-155136 | 7/2009 |
| JP | 2009155136 A * | 7/2009 |
| WO | WO 2009/054411 | 4/2009 |

OTHER PUBLICATIONS

International Search Report issued Dec. 14, 2010 in PCT/JP2010/068641 filed Oct. 21, 2010.

* cited by examiner

*Primary Examiner* — Catherine A Simone
(74) *Attorney, Agent, or Firm* — Oblon, Spivak, McClelland, Maier & Neustadt, L.L.P.

(57) ABSTRACT

The invention has an object to provide a display glass substrate capable of reducing poor film application and a method for manufacturing the same. The display glass substrate is a display glass substrate 20 for use in a flat panel display constituted of two main surfaces and four end faces. In this display glass substrate, when one main surface is set horizontal, the substrate end portion area 21 of at least one main surface existing in the range of 1~30 mm inwardly of the substrate end $E_0$ thereof has an elevation difference of 15 μm or less.

14 Claims, 10 Drawing Sheets

GLASS SUBSTRATE FOR DISPLAY AND METHOD FOR MANUFACTURING THE GLASS SUBSTRATE

TECHNICAL FIELD

The present invention relates to a display glass substrate and a method for manufacturing the same. Specifically, the invention relates to a display glass substrate to be manufactured through a film forming step for use in a flat panel display and a method for manufacturing the same.

BACKGROUND ART

Conventionally, when a film is formed on a glass substrate placed on a stage using a slit nozzle, there is known a detecting method for specifying foreign materials stuck to the surface of the stage and the back surface of the glass substrate (for example, see the patent reference 1). In the foreign material detecting method disclosed in the patent reference 1, on the slit nozzle, a glass substrate surface detecting sensor and a stage surface detecting sensor are provided, a clearance amount $L_1$ between the leading end of the slit nozzle and glass substrate surface and a clearance amount $L_2$ between the slit nozzle leading end and stage are measured, a difference between the two clearance amounts ($L_2-L_1$) is obtained, and the clearance amounts difference ($L_2-L_1$) is compared with the thickness of the glass substrate used, thereby checking the presence or absence of the distortion of the glass substrate caused by foreign materials stuck to the stage surface and glass substrate back surface, and thus specifying the foreign materials stuck to the stage surface and glass substrate back surface.

Also, since, when carrying out such glass substrate foreign material detecting method, the stage surface detecting sensor provided on the slit nozzle is able to monitor the state of the stage through the glass substrate and also monitor the flatness of the stage, the parallelism of the slit nozzle and stage can be maintained and the formation of a uniform film is possible.

PRIOR ART REFERENCES

Patent Documents

Patent Reference 1: JP-A-2007-301495

SUMMARY OF THE INVENTION

Problems to be Solved by the Invention

However, in the structure disclosed in the above patent reference 1, foreign materials on the substrate can be detected but poor film application or the like caused by the shape of the substrate cannot be detected. For example, in the case that, because the elevation difference of the end portion of the substrate is large, the stage surface detecting sensor is not allowed to function properly to thereby generate poor film application, it is impossible to take measures to improve such poor film application. Also, in the conventional structure, no consideration is paid in order to improve the shape of the substrate for reduction of the poor film application.

Thus, it is an object of the invention to provide a display glass substrate capable of reducing poor film application and a method for manufacturing the same.

Means for Solving the Problems

The first invention provides a display glass substrate for use in a flat panel display including: two main surfaces; and four end faces, wherein when one main surface is set horizontal, the substrate end portion area of at least one main surface existing in the range of 1~30 mm inwardly of the substrate end thereof has an elevation difference of 15 μm or less.

This invention can provide a display glass substrate in which its substrate end portion area except for the chamfered portion has a small elevation difference. When manufacturing a flat panel display, working in various processes including a film forming process can be facilitated.

The second invention provides a display glass substrate of the first invention, wherein the substrate end portion area is a substrate end portion area existing on the film forming surface side.

In this invention, in a film forming step necessary in a process for manufacturing a flat panel display from a display glass substrate, there can be reduced poor film application due to the elevation difference of the rounded shape of the substrate end portion.

The third invention provides a method for manufacturing a display glass substrate for use in a flat panel display, including: a first heating step of successively supplying molten glass to the bath surface of molten metal to form a glass ribbon advancing on the bath surface and also heating the glass ribbon while the temperatures of the breadth direction end portions of the glass ribbon are set higher than that of the central portion thereof; a second heating step of advancing the glass ribbon in its advancing direction and also heating the glass ribbon while the temperature of the breadth direction central portion of the glass ribbon is set higher than those of the end portions thereof; and, a cutting step of cutting the glass ribbon after cooled in the breadth direction.

In this method, the glass ribbon can be formed such that its end portions in the breadth direction are sufficiently thick, and thus the glass ribbon can be formed to have a shape suitable for a display glass plate to be produced through a resist applying step.

The fourth invention provides a display glass substrate manufacturing method of the third invention, wherein, when the viscosity of the molten glass is in the range of $10^{4.5}$~$10^{6.4}$ poise, the first heating step is switched over to the second heating step.

In this method, the heating pattern can be switched at proper timing and the end portions can be formed thick positively.

The fifth invention provides a method for manufacturing a display glass substrate for use in a flat panel display, including: a glass ribbon forming step of successively supplying molten glass to the bath surface of molten metal to form a glass ribbon advancing on the bath surface; a plate thickness distribution measuring step of measuring the breadth direction plate thickness distribution of the glass ribbon; and, a glass ribbon cutting step of cutting the glass ribbon along the advancing direction based on the plate thickness distribution such that larger thickness portions provide end portions thereof.

In this method, with the plate thickness distribution taken into consideration, the glass ribbon can be cut to a shape suitable for a display glass substrate.

The sixth invention provides a display glass substrate manufacturing method of the fifth invention, wherein the plate thickness distribution measuring step is carried out during the advancing movement of the glass ribbon using a laser displacement gage.

In this method, the plate thickness distribution can be obtained in the glass ribbon forming process, thereby being able to manufacture a display glass substrate which can eliminate the loss of time for measurement and reduce poor film application.

Effects of the Invention

According to the invention, it is possible to provide a display glass substrate which can reduce poor film application.

BRIEF DESCRIPTION OF THE DRAWINGS

FIG. 11 shows a state for measuring the distance from the surface of the glass ribbon 11a.

FIG. 12 shows an example of the breadth direction section structure of the surface shape of the glass ribbon 11a.

MODES FOR CARRYING OUT THE INVENTION

Now, description will be given below of the mode for carrying out the invention with reference to the accompanying drawings.

Embodiment 1

Figure 1:
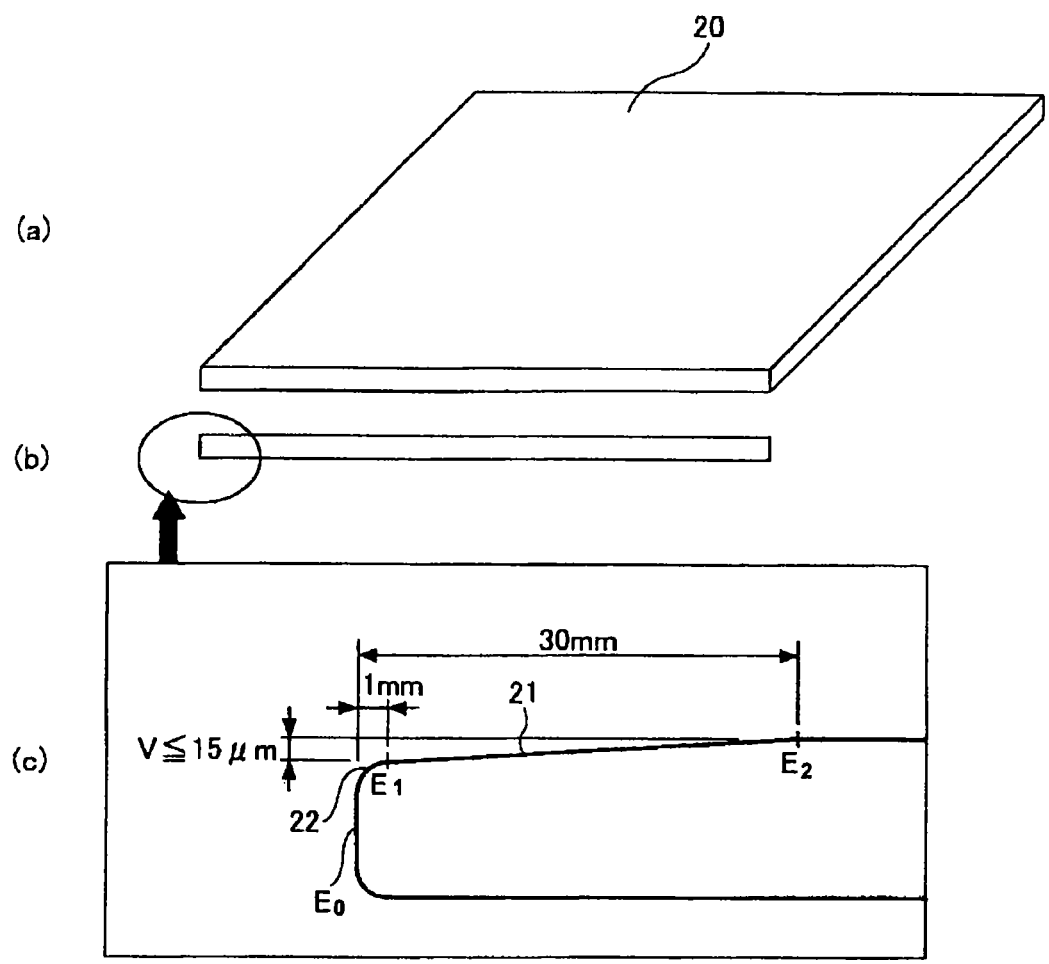
FIG. 1 shows an example of the shape of a display glass substrate 20 according to an embodiment 1. Specifically, a section (a) of FIG. 1 is a perspective view of the display glass substrate 20 according to the embodiment 1. A section (b) of FIG. 1 is a side view of the display glass substrate 20 according to the embodiment 1. A section (c) of FIG. 1 is an enlarged view of the substrate end portion area 21 of the display glass substrate 20 according to the embodiment 1.

FIG. 1 is a view of an example of the shape of a display glass substrate 20 according to an embodiment 1. Specifically, a section (a) of FIG. 1 is an example of a perspective view of the display glass substrate 20 according to the embodiment 1. A section (b) of FIG. 1 is an example of a side view of the display glass substrate 20 according to the embodiment 1.

As shown in the sections (a) and (b) of FIG. 1, the display glass substrate 20 according to the embodiment 1 is a plate-shaped glass substrate having a square plane shape. Here, as the material of the display glass substrate 20, there may be selected proper glass material according to applications.

A section (c) pf FIG. 1 is an enlarged view of the substrate end portion area 21 of the display glass substrate 20 according to the embodiment 1 as shown in the section (b) of FIG. 1. In the section (c) of FIG. 1, the display glass substrate 20 according to the embodiment 1 includes a substrate end portion area 21 starting from a position of 1 mm inwardly of the substrate end $E_0$ and extending in the range of 1~30 mm inwardly of the substrate end $E_0$. The substrate end portion area 21 is an area of the substrate end portion intervening between an outer end $E_1$ and an inner end $E_2$, while the outer end $E_1$ exists at a position of 1 mm inwardly of the substrate end $E_0$ and the inner end $E_2$ exists at a position of 30 mm inwardly of the substrate end $E_0$. The substrate end $E_0$ includes a chamfered portion 22 the corner of which has been rounded. The chamfered portion 22, generally, is formed to have a breadth of 1 mm or less when viewed from the substrate end $E_0$ and, for example, it has a breadth of about 0.5 mm. In the case of the display glass substrate 20 of the embodiment 1, in the substrate end portion area 21 excluding the chamfered portion 22, the elevation difference V of the substrate surface is set for 15 μm or less. That is, the display glass substrate 20 of the embodiment 1, in the range of 1~30 mm inwardly of the substrate end $E_0$, has a shape in which the elevation difference V of the substrate surface is set for 15 μm or less. Also, in the section (c) of FIG. 1, the display glass substrate 20 has a side surface shape in which the inclination of the substrate surface goes down from the inner end $E_2$ of the substrate end portion area 21 toward the outer end $E_1$. Here, the chamfered portion 22 has an elevation difference of several hundreds of μm or so and, for example, an elevation difference of 0.4 mm (=400 μm). The chamfered portion 22 is a portion which is formed by rounding and removing the pointed portion of the edge of the display glass substrate 20 and is a portion necessary in working the display glass substrate 20. However, in a resist applying step necessary in the film forming step, the chamfered portion 22 is not a portion to which a resist is applied and thus an area, which excludes the edge portion extending 1 mm from the substrate end $E_0$ including the chamfered portion 22, is defined as the substrate end portion area 21.

Generally, in the case of the display glass substrate 20, a process for manufacturing a flat panel display, in many cases, includes a film forming step. For example, in the case of a liquid crystal display, on a glass substrate for color filter providing the front surface side thereof, there is formed a film for a black matrix and a color filter. Also, on a TFT glass substrate providing the back surface side, there is formed an amorphous silicon film serving as a TFT (Thin Film Transistor). Also, for example, in the case of a plasma display, there is formed an ITO (Indium Tin Oxide) film or a dielectric film. In such film forming step, in most cases, after the whole surface of the display glass substrate 20 is coated with a film, patterning is carried out using a resist and next a film having a desired pattern shape is formed by etching. In such film forming step, as shown in the section (c) of FIG. 1, the substrate surface of the substrate end portion area 21 has a shape descending from the inner end $E_2$ toward the outer end $E_1$ and it is known that, when its elevation difference V becomes, for example, 20 μm or larger, the poor application of the resist is easy to occur. Although the details of this phenomenon will be described later, as in the display glass substrate 20 according to the embodiment 1, since the substrate end portion area 21 has a shape of a small elevation difference V, in the resist applying step of the film forming step, the poor resist application can be reduced.

Figure 2:
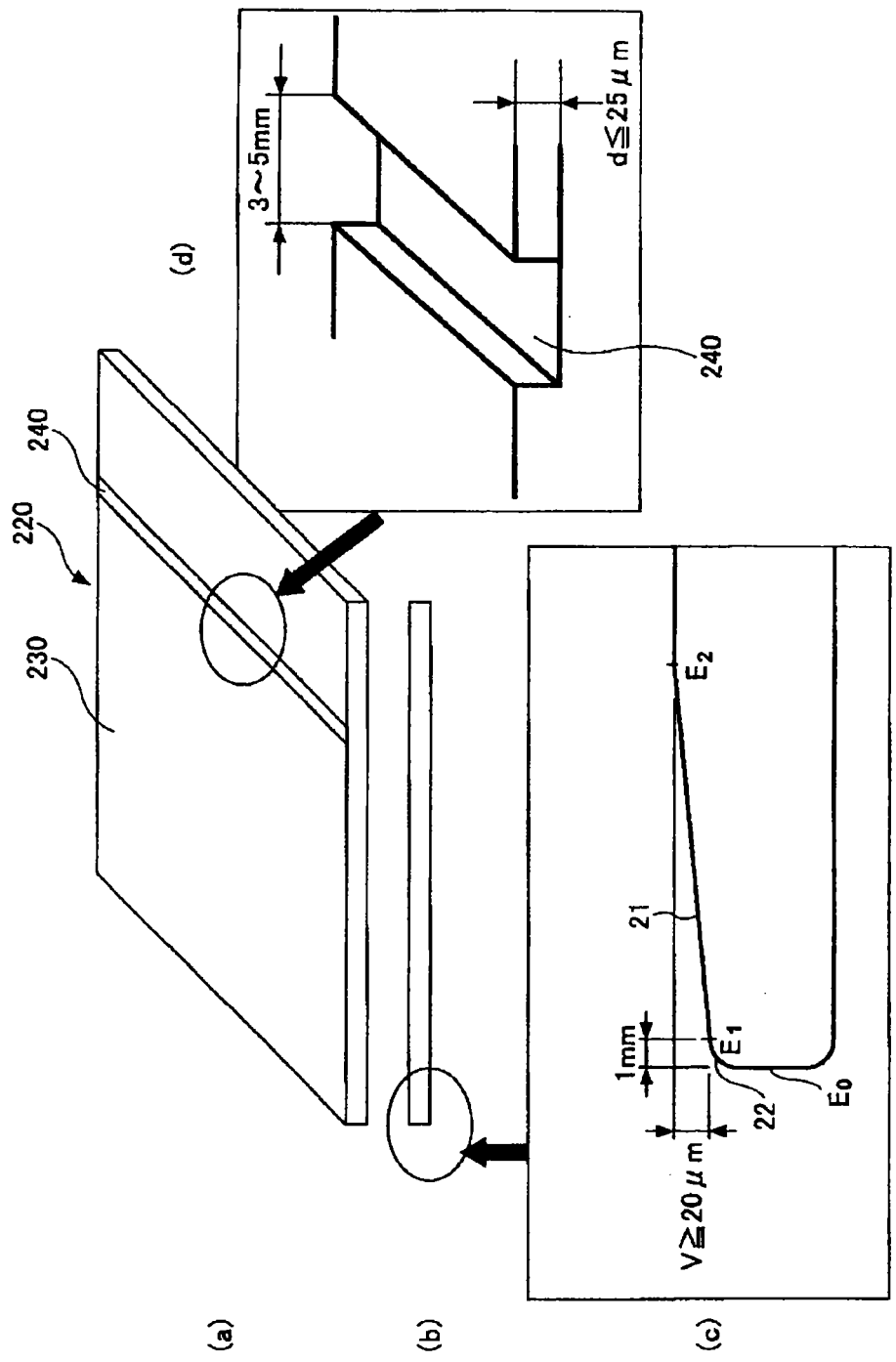
FIG. 2 is a view of a conventional display glass substrate 220, showing a state after a film forming step is ended. Specifically, a section (a) of FIG. 2 is a perspective view of the conventional display glass substrate 220 after film formation. A section (b) of FIG. 2 is a side view of the conventional display glass substrate 220 after film formation. A section (c) of FIG. 2 is a partially enlarged side view of the substrate end portion of the conventional display glass substrate 220 after film formation. A section (d) of FIG. 2 is a partially enlarged view of a missing defect 240 found in a gate film 230.

Next, using FIG. 2, as a conventional example, description will be given below of an example of a conventional substrate end portion area 220. FIG. 2 is a view of the state of the conventional display glass substrate 220 after end of a film forming step.

A section (a) of FIG. 2 is a perspective view of the conventional display glass substrate 220 after film formation. In the section (a) of FIG. 2, on the surface of the display glass substrate 220, a TFT gate film 230 is formed and, a missing defect 240 is formed on the surface of the gate film 230. The missing defect 240 of the gate film 230, when viewed from above, has a linear shape.

A section (b) of FIG. 2 is a side view of the conventional display glass substrate 220 after film formation, and a section (c) of FIG. 2 is a partially enlarged side view of the substrate end portion of the conventional display glass substrate 220 after film formation. In the section (c) of FIG. 2, the conventional display glass substrate 220 is similar to the display glass substrate 20 according to the present embodiment shown in FIG. 1 in that the substrate end portion area 21 extends in the range of 1~30 mm inwardly of the substrate end $E_0$ excluding the chamfered portion 22 existing adjacent to the substrate end $E_0$. However, the substrate 220 is different from the substrate 20 in that the elevation difference V between the outer end $E_1$ and inner end $E_2$ of the substrate end portion area 21 is 20 μm or more. In the substrate end portion area 21 extending in the range of 1~30 mm spaced from the substrate end $E_0$, when the elevation difference V is 20 μm or more, such missing defect 240 of the gate film 230 as shown in the section (a) of FIG. 2 is easy to occur.

A section (d) of FIG. 2 is an enlarged view of the missing defect 240 of the gate film 230. In the section (d) of FIG. 2, the missing defect 240 like a groove having a width of 3~5 mm and a depth d of 25 μm or less has occurred. Thus, in the substrate end portion area 21, when the elevation difference V of the substrate surface is 20 μm or more, in the gate film forming step, in many cases, a defect can occur in the gate film 230.

Figure 3:
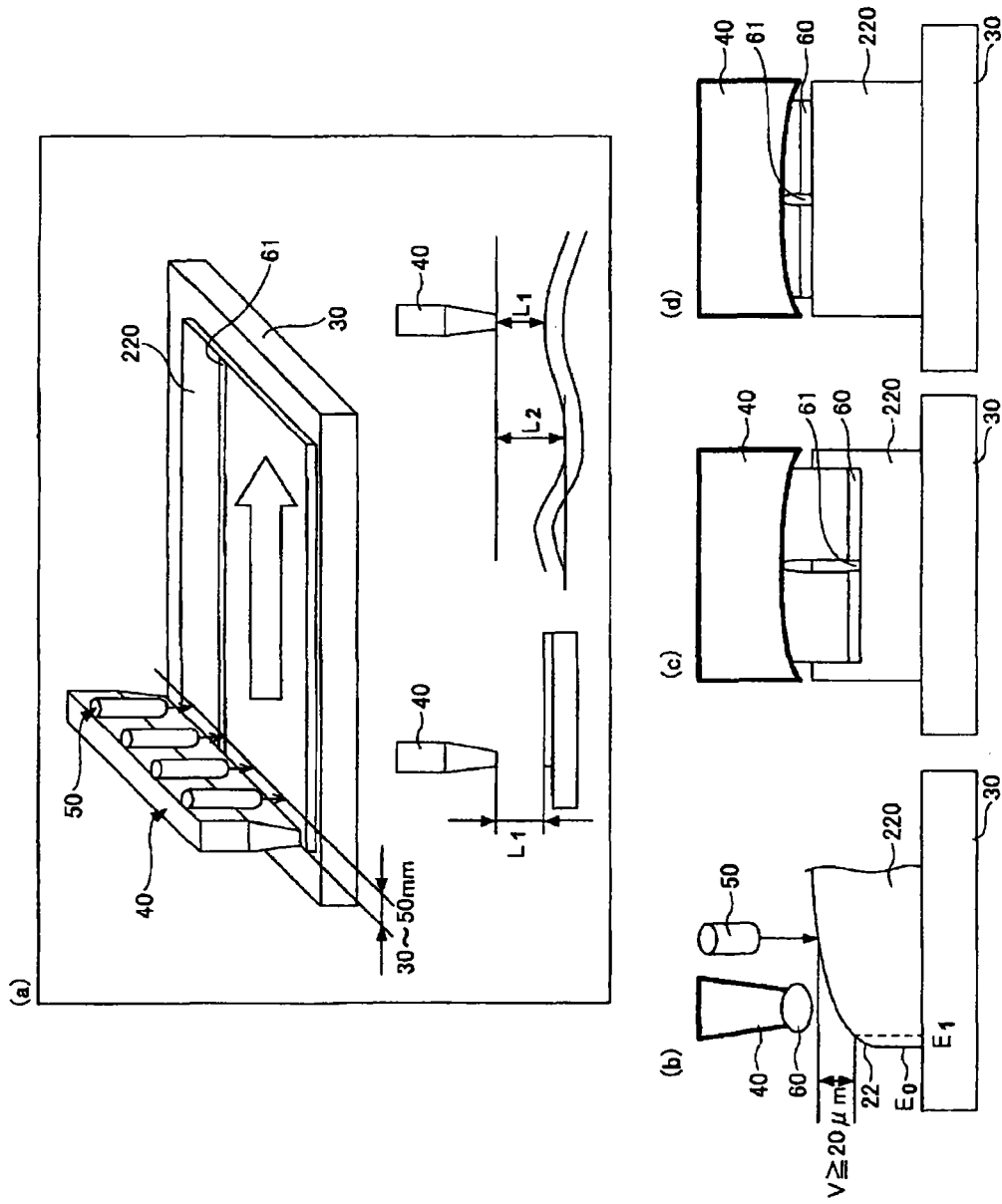
FIG. 3 is a view to explain the generation factors of the missing defect 240 of the gate film 230. Specifically, a section (a) of FIG. 3 is a view of an example of a resist applying step for forming the gate film. A section (b) of FIG. 3 is a section view of the relationship between a nozzle 40 and the conventional display glass substrate 220. A section (c) of FIG. 3 is a front view of the nozzle 40, when it is viewed from the opposite side to its advancing direction. A section (d) of FIG. 3 is a front view of the nozzle 40, showing a state where it has reached the flat portion of the display glass substrate 220.

FIG. 3 is a view to explain factors causing the missing defect 240 of the gate film 230. A section (a) of FIG. 3 is a view of an example of a resist applying step of forming the gate film. In the section (a) of FIG. 3, a conventional display glass substrate 220 is placed on a stage 30. On the left substrate end portion of the display glass substrate 220, there are provided a nozzle 40 for applying resist and a sensor 50 for measuring the distance between the nozzle 40 and substrate surface. In the resist applying step, items to be controlled are the discharge liquid quantity of the resist and the distance L between the nozzle 40 and substrate surface. In the case of the distance L between the nozzle 40 and substrate surface, the distance L is measured by the sensor 50 and the height of the nozzle 40 is adjusted so that the distance L can provide a proper distance. While running in the lateral direction, the nozzle 40 supplies the resist to the display glass substrate 220, whereby the resist is applied onto the substrate surface. Here, the nozzle 40 height adjustment by the sensor 50 is made only in the area of 30 to 50 mm of the substrate end portion. Also, the nozzle 40 is a slit nozzle and is capable of supplying the resist wholly in the lateral direction.

A section (b) of FIG. 3 is a section view of the nozzle 40 and the conventional display glass substrate 220, showing the relationship between them in the nozzle advancing direction. In the section (b) of FIG. 3, the sensor 50 is disposed forwardly of the nozzle 40 in the advancing direction and is measuring the height distance of the near flat portion of the display glass substrate 220. On the other hand, the nozzle 40 is disposed inwardly of the chamfered portion 22 existing adjacent to the substrate end $E_0$. When the nozzle 40 supplies the resist 60 in this state, in the case of the conventional display glass substrate 220, the resist 60 is supplied to a position lower by 20 μm or more than the position of the substrate surface measured by the sensor 50. In the case that the resist 60 is supplied from the nozzle 40 in this manner, it is easy to cause a phenomenon that the resist 60 is not applied onto the display glass substrate 220 properly to thereby cause a missing defect.

A section (c) of FIG. 3 is a front view of the nozzle 40, when it is viewed from the opposite side to its advancing direction. As shown in the section (c) of FIG. 3, the central portion of the supply port of the nozzle 40 has a higher height than its two end portions and thus the distance of the central portion from the substrate surface is larger than that of the two end portions. Therefore, the influence of the elevation difference V in the substrate end portion described with reference to the section (b) of FIG. 3 is easier to occur in the central portion. In the section (c) of FIG. 3, the resist 60 is supplied from the whole of the nozzle 40 in the lateral direction but there is caused a missing portion 61 in the central portion.

A section (d) of FIG. 3 is a front view of the nozzle 40, showing a state where it has moved and reached the flat portion of the display glass substrate 220. As shown in the section (c) of FIG. 3, once the missing portion 61 occurs in the substrate end portion, even when the nozzle 40 reaches the flat portion (central portion) of the substrate and the distance L between the nozzle 40 and substrate surface reduces, the missing portion 61 remains there. Due to this phenomenon, the missing portion 61 is caused in the resist film.

Next, description will be given below of the probable factors of the missing defect 240 of the gate film 230. As described in the sections (a) to (d) of FIG. 3, it can be detected that the missing defect of the gate film 230 may be caused by the poor application of the resist film. And, the inventors have found that the poor application of the resist film is easy to occur when the difference between the maximum value $L_2$ and minimum value $L_1$ of the distance L between the nozzle 40 and substrate surface is larger than 20 μm.

For the probable factors of missing defect, on the side of the display glass substrate 220, the dents, plate thickness distribution and end portion shape thereof can be detected. Also, on the side of the resist applying apparatus, the clogging, nozzle warping and the like thereof can be detected. Of these factors, as described in the sections (a) to (d) of FIG. 3, the end portion shape of the display glass substrate 220 can provide a great factor. Actually, it has been found that the missing portion 61 of the resist 60 described in the sections (a) to (d) of FIG. 3 is easy to occur when, in the range of 1~30 mm from the substrate end $E_0$, the elevation difference V is 20 μm or more. Of the shapes of the display glass substrate 220, the shape of the range of 1~30 mm from the substrate end $E_0$ is especially important. The reason for this is as follows: when the missing portion 61 of the resist 60 does not occur in the range of 1~30 mm from the substrate end $E_0$, there is no possibility that the poor application of the resist film can occur in a step of applying the resist to the glass central portion.

Thus, in the display glass substrate 20 of the present embodiment, in the substrate end portion area 21 existing in the range of 1~30 mm from the substrate end $E_0$, by setting the elevation difference V of the substrate surface 15 μm or less, the phenomenon of causing a missing portion in the resist film can be prevented.

Figure 4:
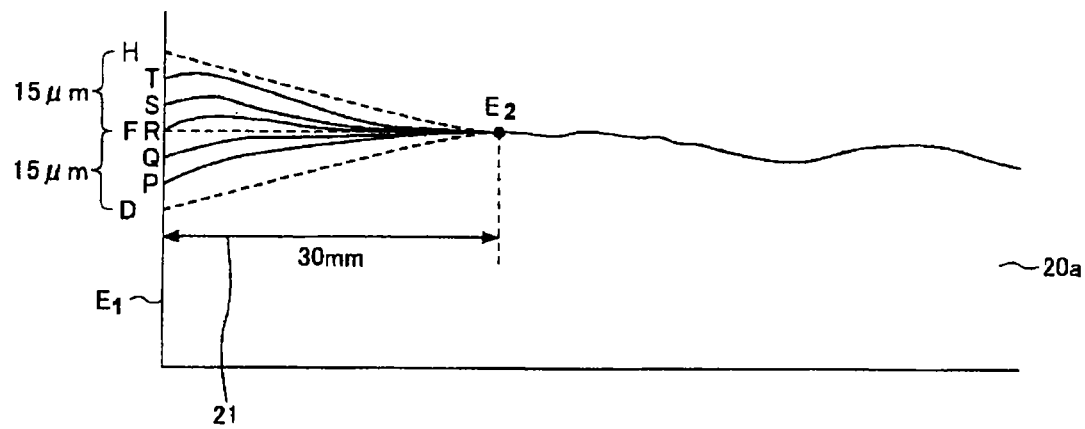
FIG. 4 shows an example of the section structure of the substrate end portion area 21 of a display glass substrate 20a according to an embodiment 1.

FIG. 4 is a view of an example of the section structure of the substrate end portion area 21 of a display glass substrate 20*a* according to the embodiment 1. Specifically, FIG. 4 shows examples in which the heights of the substrate surface of the substrate end portion area 21 existing outwardly of the substrate inner end $E_2$ is all higher or lower than the substrate inner end $E_2$. While FIG. 4 shows the substrate end portion area 21 of a display glass substrate 20*a* according to the embodiment 1, this substrate end portion area 21 is similar to one shown in FIG. 1 in that it extends in the range of 1~30 mm spaced from the substrate end $E_0$ excluding the chamfered portion 22. Here, referring to the shape of the chamfered portion 22, since it has no direct relation with the invention, in FIG. 4, the chamfered portion 22 is omitted and the left end thereof is shown as the outer end $E_1$ of the substrate end portion area 21. In FIG. 4, there are examples of the section shapes of substrate end portion areas according to five modes P~T. Also, when the inner end $E_2$ of the substrate end portion area 21 is regarded as the horizontal reference F of a "0" level, in the outer end $E_1$, a point 15 μm lower than the inner end $E_2$ is designated by D, while a point 15 μm higher than the inner end $E_2$ is designated by H.

The section of the substrate surface designated by P has a shape in which, similarly to one described in FIG. 1, the substrate surface descends from the inner end $E_2$ of the substrate end portion area 21 toward the outer end $E_1$. The descending amount of the section shape designated by the point P in the substrate end portion area 21 is smaller than 15 μm, because, in the outer end E1, the point P exists at a position higher than the point D in the substrate end portion area 21. Similarly, a section shape designated by Q also descends more in the inner end $E_2$ than in the outer end $E_1$, while its descending amount is lower than that of the curved line P and its flatness is enhanced.

The section of a substrate surface designated by R has a shape in which the outer end $E_1$ and inner end $E_2$ both provide the horizontal reference F. The surface of the display glass substrate 20*a* has such flatness as allows the glass substrate to be used as a glass plate for a flat panel display. However, when it is enlarged in micron order, as shown in FIG. 4, in some cases, it rises and falls in slight arcs. Thus, even when the outer end $E_1$ is as high as the inner end $E_2$ as in the section shape of the substrate surface designated by R, a slight elevation difference may exist. In FIG. 4, the substrate end portion area 21, as a whole, is slightly higher in the section shape than the horizontal reference F.

The section of the substrate surface designated by S has a shape in which the substrate surface of the outer end $E_1$ is higher than the inner end $E_2$ of the substrate end portion area 21. Thus, in the case of the section shape of the substrate end portion area 21, the outer end $E_1$ can be lower or higher than the inner end $E_2$. In the case of the section shape of a substrate surface designated by T as well, similarly to S, the substrate surface of the outer end $E_1$ is higher than the substrate surface of the inner end $E_2$ of the substrate end portion area 21. The section shape designated by T is higher than the section shape designated by S as a whole. However, in the case of the section shape designated by T as well, since T is lower than H, its elevation difference in the substrate end portion area 21 is smaller than 15 μm.

As described above, the display glass substrate 20*a* according to the present embodiment can provide various section shapes provided that the elevation difference is 15 μm or less in the substrate end portion area 21. Any one of the shapes, can reduce the missing poor resist application in the resist applying step and thus, to form a film free from missing poor film application in the following step of forming a film such as a gate film 230.

Embodiment 2

Figure 5:
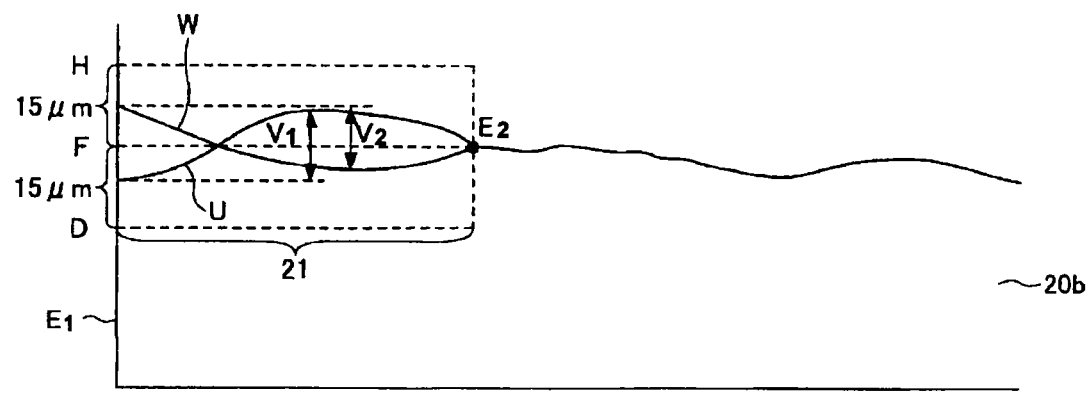
FIG. 5 shows an example of the section structure of the substrate end portion area 21 of a display glass substrate 20b according to an embodiment 2.

FIG. 5 is a view of an example of the section structure of the substrate end portion area 21 of a display glass substrate 20*b* according to an embodiment 2. Specifically, FIG. 5 shows an example of the display glass substrate 20*b* in which the section shape of the substrate end portion area 21 includes both of higher and lower portions than the horizontal reference F. In FIG. 5, the section shape of a substrate surface designated by U inclines upwardly once and then downwardly from the inner end $E_2$ of the substrate end portion area 21 toward the outer end $E_1$, and finally it is lower than the horizontal reference F in the outer end $E_1$. In this case, the elevation difference in the substrate end portion area 21 provides $V_1$ between the highest and lowest points. When $V_1$ is 15 μm or less, the section shape falls under the display glass substrate 20*b* of this embodiment.

Also, the section shape of a substrate surface designated by W inclines downwardly once from the inner end $E_2$ of the substrate end portion area 21 and then upwardly, and in the outer end $E_1$, it is higher than the horizontal reference F. In this case as well, since the elevation difference $V_2$ between the highest and lowest points is 15 μm or less, the section shape falls under the display glass substrate 20*b* of this embodiment.

As described above, the display glass substrate 20, 20*a* or 20*b* according to the present embodiment can have various shapes provided that the elevation difference is 15 μm in the substrate end portion area 21 extending in the range of 30 mm from the outer end $E_1$. Also, any one of the shapes, enable the reduction of the missing poor resist application and poor film formation in the following film forming step.

Next, using FIGS. 6 to 9, description will be given below of an example of a method for manufacturing the display glass substrate 20, 20*a* or 20*b* according to the present embodiment.

Figure 6:
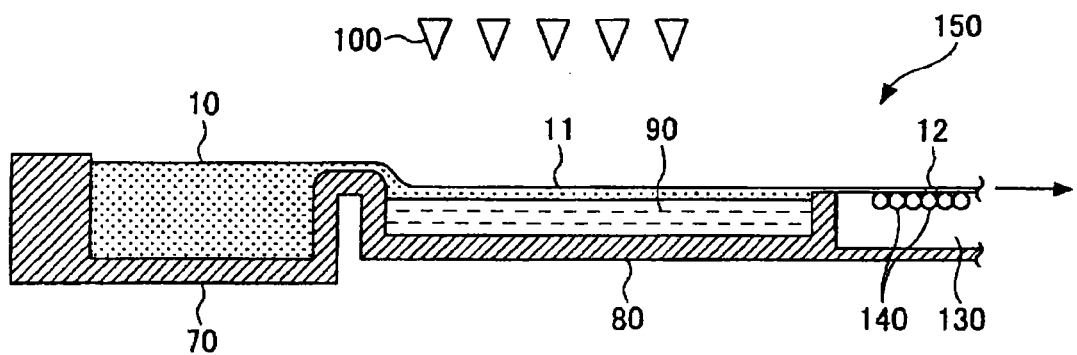
FIG. 6 is a side view of an example of a glass plate manufacturing apparatus 150 used in a method for manufacturing the display glass substrates 20, 20a and 20b according to the present embodiment.

FIG. 6 is a side view of an example of a glass plate manufacturing apparatus 150 used in a method for manufacturing the display glass substrate 20, 20*a* and 20*b* according to the present embodiment. In FIG. 6, the glass manufacturing apparatus 150 includes a tank furnace 70, a metal bath 80 and a layer 130. The tank furnace 70 is used to store molten glass 10 therein. The metal bath 80 stores molten metal, namely, molten tin 90 therein and includes heaters 100 in the upper space thereof. The layer 130 includes roller conveyors 140.

The molten glass 10 stored in the tank furnace 70 is fed into the metal bath 80 and is spread on the molten tin 90, whereby it finally has a substantially equilibrium thickness. The molten glass 10 spread on the molten tin 90 is pulled in the direction of the layer 130 and, while being enlarged, is allowed to advance on the bath surface of the molten tin 90 downstream of the metal bath 80 so as to be a band-shaped glass ribbon 11 of a given breadth.

Figure 7:
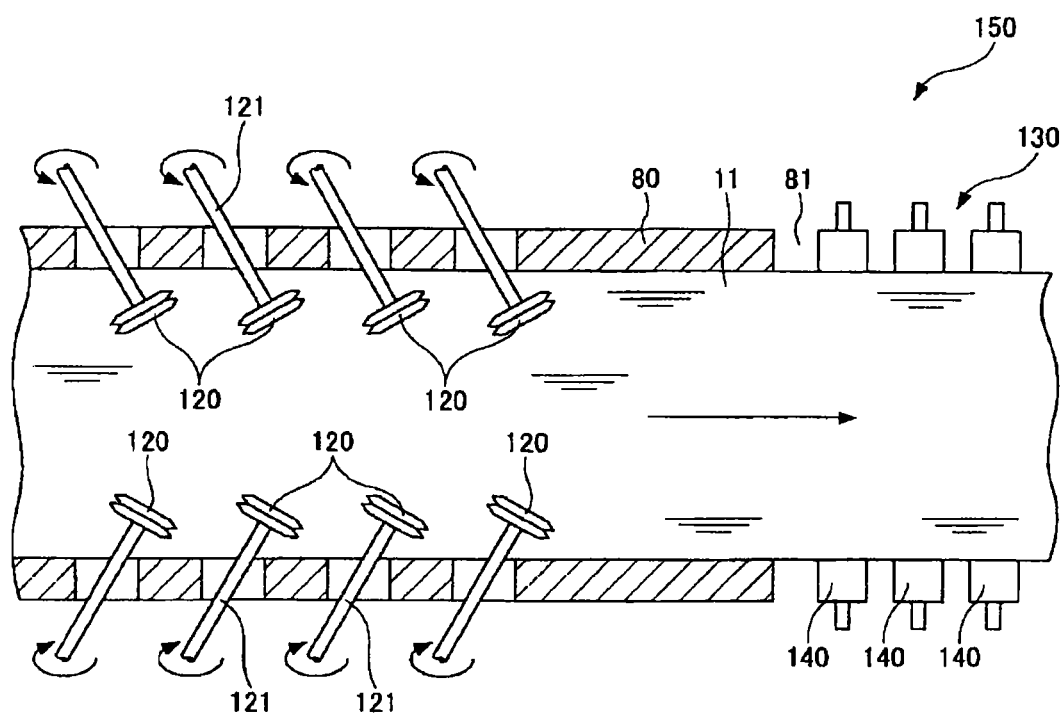
FIG. 7 is a plan view of a metal bath 80 and a layer 130 included in the glass plate manufacturing apparatus 150.

FIG. 7 is a plan view of the metal bath 80 and layer 130 of the glass plate manufacturing apparatus 150 shown in FIG. 6. In FIG. 7, multiple edge rollers 120 are provided on both sides of the metal bath 80. Each edge roller 120 is rotated by a rotation shaft 121 in the arrow direction in such a manner that it spreads the glass ribbon 11 in its breadth direction. The glass ribbon 11 is spread in the breadth direction by the edge rollers 120, is moved downstream while being heated by the heaters 100 (see FIG. 6) and, before it reaches the exit portion 81 of the metal bath 80, is cooled down to such temperature that it cannot be deformed even when it is contacted with the roller conveyors 140.

The glass ribbon 11 having reached the exit portion 81 of the metal bath 80 is slightly raised in the vicinity of the exit portion 81 and is moved into the layer 130 (see FIG. 6). And, the plate glass 12 is cooled while being delivered by the multiple roller conveyors 140 and is finally cooled down to the room temperature, thereby producing the plate glass 12.

The above is the entire steps to be carried out until the plate glass 12 is produced. Next, by cutting the plate glass 12, the display glass substrate 20, 20a or 20b can be manufactured. Here, in the display glass substrate 20, 20a or 20b manufacturing method according to the present embodiment, when the glass ribbon 11 moves through the metal bath 80 while being spread in the breadth direction by the edge rollers 120, it receives such treatment that its two ends are increased in thickness in the breadth direction of the glass ribbon 11.

Figure 8:
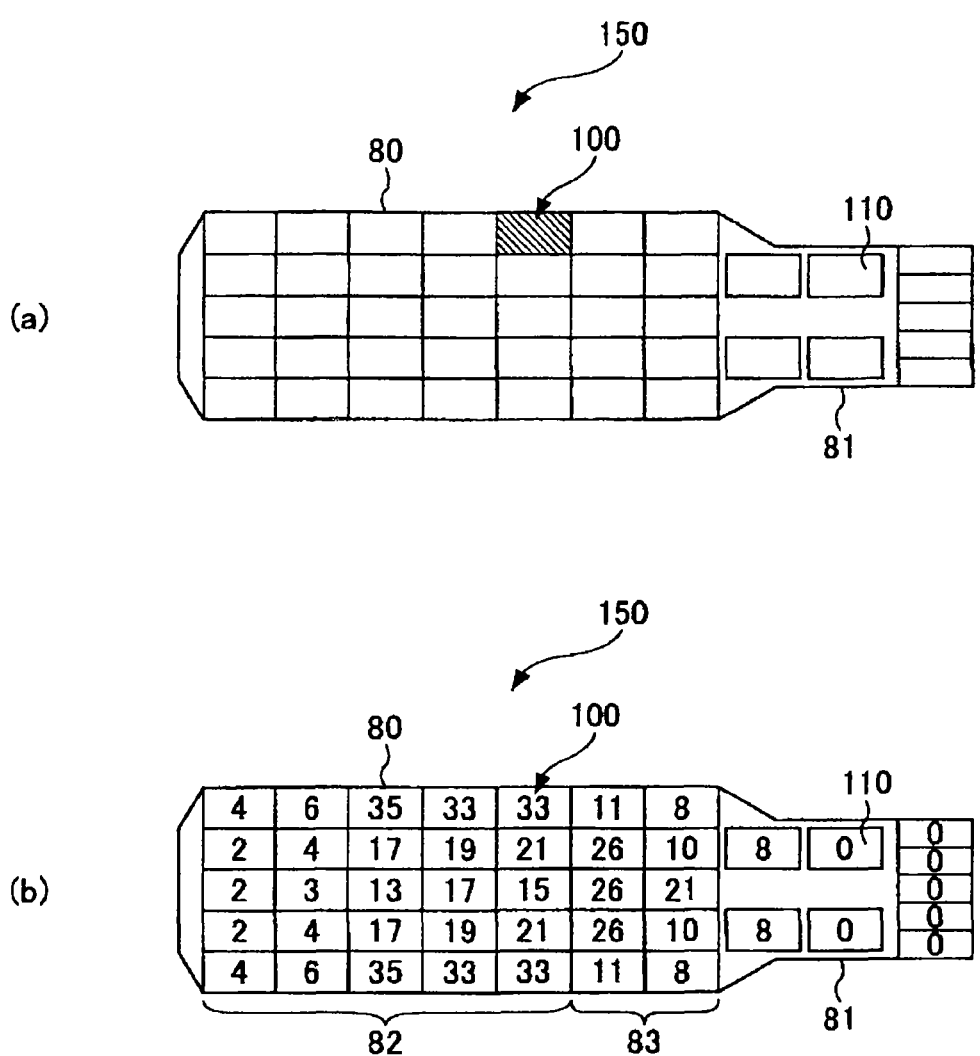
FIG. 8 is a view to explain an example of a heating treatment included in the display glass substrate 20, 20a or 20b manufacturing method according to the present embodiment. Specifically, a section (a) of FIG. 8 is a view of an example of the allocation of heaters 100. A section (b) of FIG. 8 is an explanatory view of an example to control the thickness of a glass ribbon 11.

FIG. 8 is an explanatory view of an example of a heating treatment to be carried out in the metal bath 80 in the display glass substrate 20, 20a or 20b manufacturing method according to the present embodiment. Specifically, a section (a) of FIG. 8 is a view of an example of the allocation of the heaters 100 provided upwardly of the metal bath 80. In the section (a) of FIG. 8, the heaters 100 are allocated in a lattice manner so as to cover the areas of the metal bath 80 in the advancing direction and in the breadth direction. By applying different heating temperatures to the respective allocations, the thickness of the glass ribbon 11 can be varied correspondingly to the respective allotted areas. Also, the glass ribbon 11 can be cooled by the layer 130 down to a state where it can have a certain degree of hardness.

A section (b) of FIG. 8 is an explanatory view of an example of a technique for controlling the thickness of the glass ribbon 11 using the temperatures of the heaters 100. In the section (b) of FIG. 8, there are shown the densities (which is hereinafter referred to as the output densities) of the electric energy (unit: $kW/m^2$) of the outputs of the heaters 100 in the respective allocations. The metal bath 80 is mainly divided into an upstream side 82 and a downstream side 83. In the upstream side 82, the outputs of the heaters 100 of the two end portions in the breadth direction have larger values than that of the central portion. In other words, in the heater row that is defined in relation to the breadth direction and is the third row with respect to the advancing direction, the output density of the central portion is 13 $kW/m^2$, whereas the output densities of the two end portions are respectively 35 $kW/m^2$: that is, the output densities of the two end portions are larger than that of the central portion. Similarly, in the heater row that is defined in relation to the breadth direction and is the forth row with respect to the advancing direction, the output density of the central portion is 17 $kW/m^2$, whereas the output densities of the two end portions are respectively 33 $kW/m^2$. In the heater row that is defined in relation to the breadth direction and is the fifth row with respect to the advancing direction, the output density of the central portion is 15 $kW/m^2$, whereas the output densities of the two end portions are respectively 33 $kW/m^2$. This applies similarly to the output densities of the heater rows that are defined in relation to the breadth direction and are the first and second rows with respect to the advancing direction.

On the other hand, in the downstream side 83, the output of the heater 100 in the breadth direction central portion has a larger value than those of the two end portions. In other words, in the heater row that is defined in relation to the breadth direction and is the sixth row with respect to the advancing direction, the output densities of the two end portions are respectively 11 $kW/m^2$, whereas the output density of the central portion is 26 $kW/m^2$: that is, the output density of the heater 100 in the central portion is larger than the output densities of the heaters 100 in the two end portions. Similarly, in the heater row that is defined in relation to the breadth direction and is the seventh row with respect to the advancing direction as well, the output densities of the two end portions are respectively 8 $kW/m^2$, whereas the output density of the central portion is 21 $kW/m^2$: that is, the output density of the heater 100 in the central portion is larger than the output densities of the heaters 100 in the two end portions.

In this manner, in the first heating step on the upstream side 82, the heating temperatures of the heaters 100 in the end portions are set higher than that of the heater 100 in the central portion and, in the second heating step on the downstream side 83, the heating temperatures of the heaters 100 in the end portions are set lower than that of the heater 100 in the central portion, thereby being able to form a glass ribbon 11 having a shape in which its two sides are thicker than its central portion.

Here, in the section (b) of FIG. 8, the upstream side 82 is divided into five allocations in the advancing direction and the downstream side 83 is divided into two allocations in the advancing direction. However, these allocations may be changed properly according to the properties of the glass ribbon 11 and the properties of the plate glass 12 to be produced. For example, the upstream side 82 may also be divided into four allocations in the advancing direction and the downstream side 83 may be divided into three allocations in the advancing direction.

Also, the boundary between the first heating step of the upstream side 82 and the second heating step of the downstream side 83 may also be set according to the viscosity of the glass ribbon 11. For example, when the viscosity of the glass ribbon 11 is in the range of $10^{4.5}$~$10^{6.4}$ poise, the upstream side 82 and downstream side 83 may be switched over to each other and thus the end portions and central portions of the heater distribution may be reversed. Also, in the case of alkalifree glass for liquid crystal, when its viscosity is in the range of $10^{5.3}$~$10^{6.4}$ poise, the temperature of the glass ribbon 11 becomes about 1170° C. Thus, when the temperature of the glass ribbon 11 corresponding to the viscosity is known, the upstream side 82 and downstream side 83 of the heater 100 in the metal bath 80 may also be set based on the temperature of the glass ribbon 11.

After then, as described above using FIGS. 6 and 7, by cutting the glass ribbon 11 in the breadth direction, there can be manufactured a display glass substrate in which its two end portions are thick and the substrate end portion area 21 has a small elevation difference and, especially, which does not include a descending section shape but is capable of proper resist application.

Figure 9:
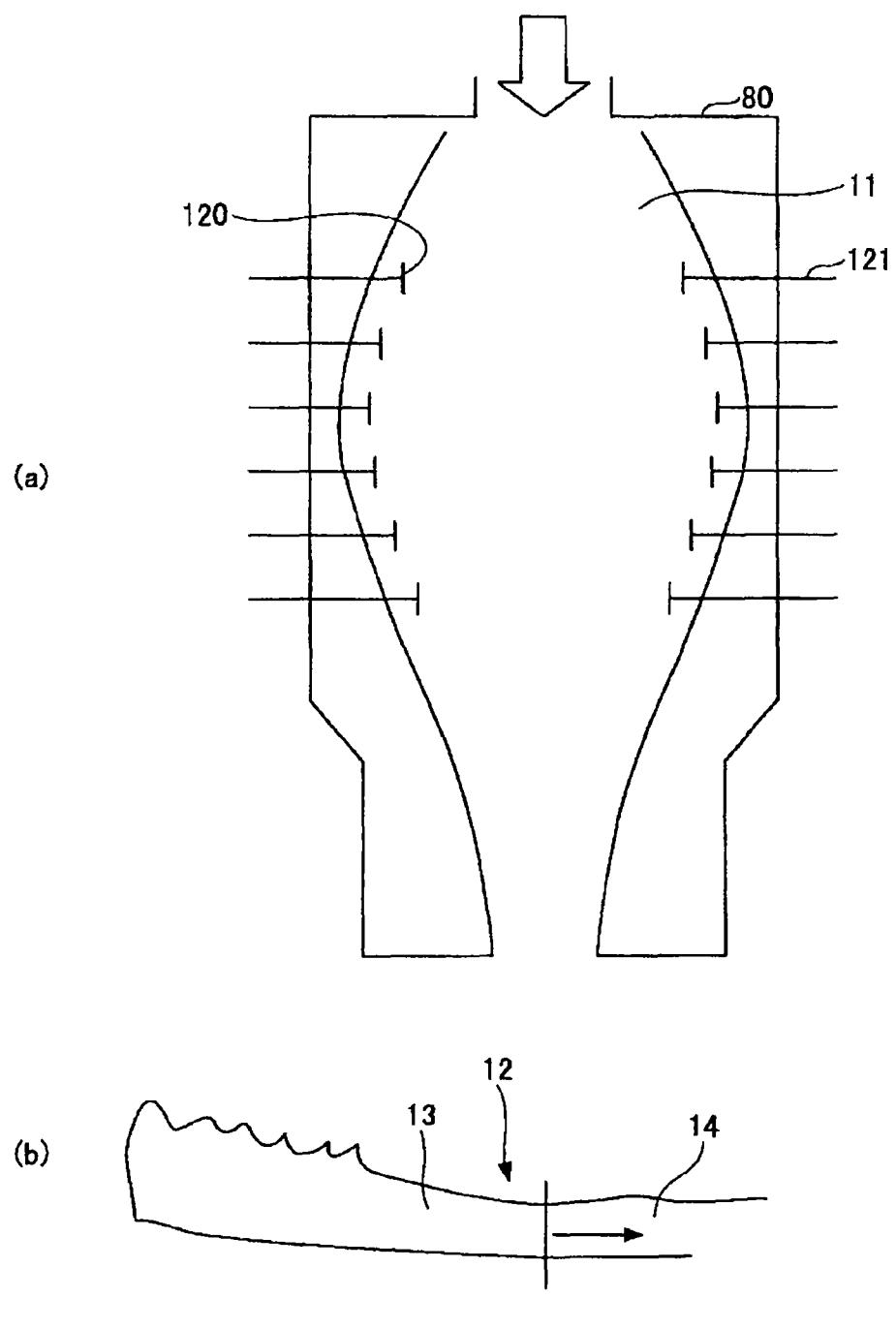
FIG. 9 is a typical view of the display glass substrate 20, 20a or 20b manufacturing method according to the present embodiment. Specifically, a section (a) of FIG. 9 shows a step of forming the glass ribbon 11. A section (b) of FIG. 9 shows an example of a step of cutting a plate glass 12.

FIG. 9 is a typical view of the display glass substrate 20, 20a or 20b manufacturing method according to the present embodiment. Specifically, a section (a) of FIG. 9 shows a step of forming the glass ribbon 11 in the metal bath 80. As shown in the section (a) of FIG. 9, the glass ribbon 11 fed into the metal bath 80 is caused to advance through the metal bath 80 while it is being spread in the breadth direction by the edge rollers 120.

A section (b) of FIG. 9 shows an example of a step of cutting the before-ear-removal plate glass 12. In the section (b) of FIG. 9, while there is shown an example of the section structure of the before-ear-removal plate glass 12, the breadth direction end portion of the plate glass 12 is cut and removed as an ear 13. And, the central portion is used as an after-ear-removal plate glass 14 and, finally, it is used as the display glass substrate 20, 20a or 20b. Here, as described above in FIG. 8, according to the display glass substrate 20, 20a or 20b manufacturing method of the present embodiment, since the two end portions of the before-ear-removal plate glass 12 have sufficient thickness, even when the ears 13 are cut and removed, the end portions of the cut and left after-ear-removal plate glass 14 can secure sufficient thickness. Thus, as described above in the embodiment 1, there can be manufactured the display glass substrate 20, 20a or 20b which allows the resist 60 to be applied properly and is thus capable of carrying out positive film formation.

Therefore, according to the display glass substrate 20, 20a or 20b manufacturing method of the present embodiment, since the before-ear-removal plate glass 12 to be formed first is formed the two end portions the thicknesses of which are thick, enables manufacturing of the display glass substrate 20, 20a or 20b which is capable of carrying out the film forming step positively.

Figure 10:
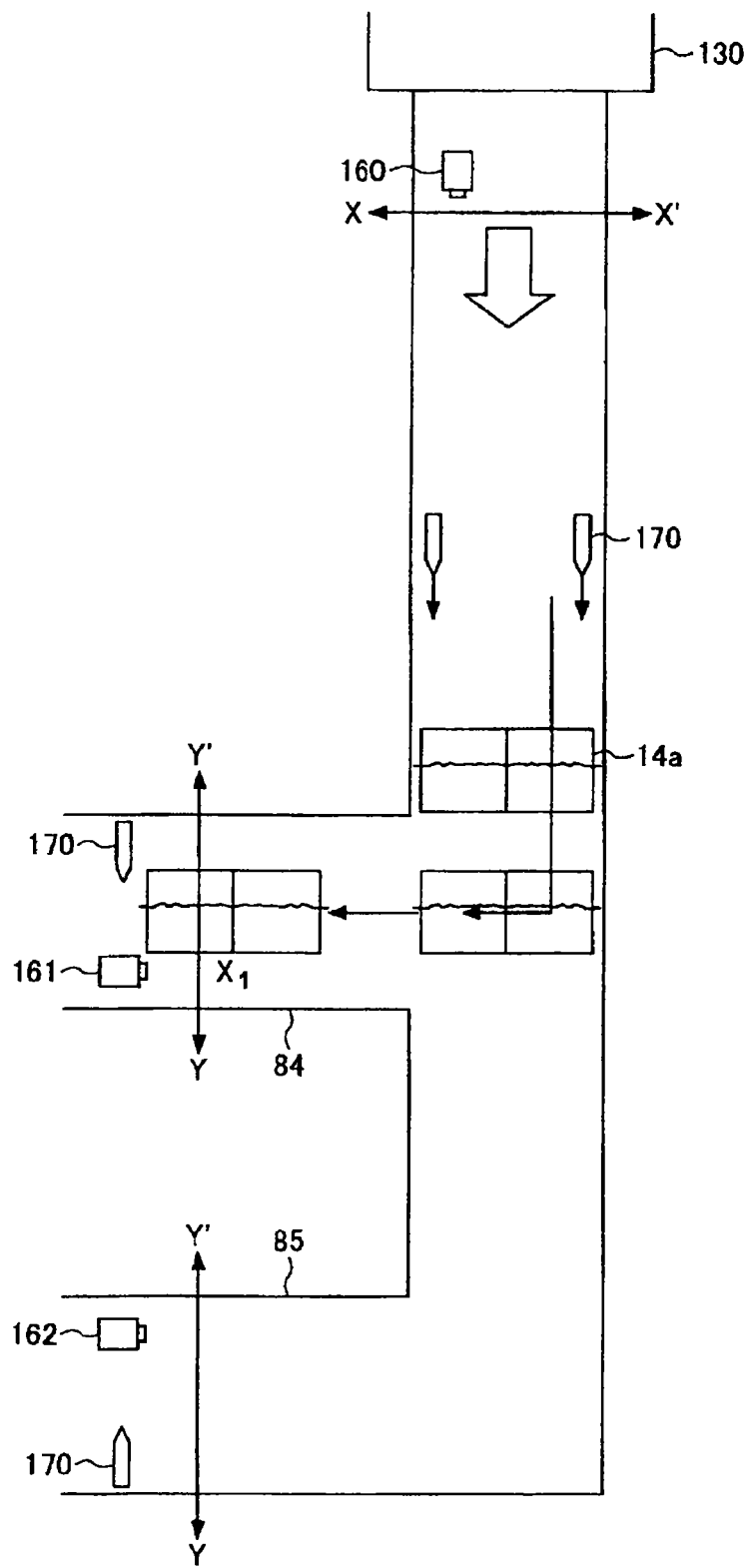
FIG. 10 is an explanatory view of an example of the display glass substrate 20, 20a or 20b manufacturing method according to the present embodiment.

FIG. 10 is an explanatory view of an example of the display glass substrate 20, 20a or 20b manufacturing method according to the present embodiment, which is different from the examples shown in FIGS. 6 to 9.

In the display glass substrate 20, 20a or 20b manufacturing method according to the present embodiment, an ordinary display glass substrate 20, 20a or 20b manufacturing method may be applied. However, in the display glass substrate 20, 20a or 20b manufacturing method according to the present embodiment, the surface shapes of plate glasses 12a and 14a are recognized using laser displacement gages 160, 161 and 162 and the plate glasses 12a and 14a are cut such that their two end portions are thick, thereby manufacturing a display glass substrate 20, 20a or 20b end portion area 21 of which has an elevation difference of 15 μm or less.

Now, description will be given below specifically of the contents of this manufacturing method. In FIG. 10, the laser displacement gage 160 is installed at a position where the glass reaches almost the room temperature after it leaves the layer 130. Also, a cutter 170 is set downstream of the laser displacement gage 160. Further, downstream in the main line after leaving the layer 130, branches 84 and 85 are provided. The laser displacement gages 161 and 162 may also be installed on the branches 84 and 85 respectively. Here, the glass ribbon 11 having left the layer 130 is cut in a direction perpendicular to the glass flow direction to provide the before-ear-removal plate glass 12a. In FIG. 10, this cutting step is omitted. Thus, description of the contents of the present manufacturing method will be started from a state where the before-ear-removal plate glass 12a is flowing in the main line.

The laser displacement gage 160 is a measuring device to measure the thickness of the before-ear-removal plate glass 12a. In the display glass substrate 20, 20a or 20b manufacturing method of the present embodiment, in order to manufacture the display glass substrate 20, 20a or 20b from the before-ear-removal plate glass 12a, while carrying out the display glass substrate 20, 20a or 20b manufacturing method according to an ordinary float technique, the laser displacement gage 160 is used to measure the displacement of the before-ear-removal plate glass 12a. In FIG. 10, when the before-ear-removal plate glass 12a moves through the X-X' section, the laser displacement gage 160 is moved in the breadth direction to measure the thickness of the before-ear-removal plate glass 12a.

Figure 11:
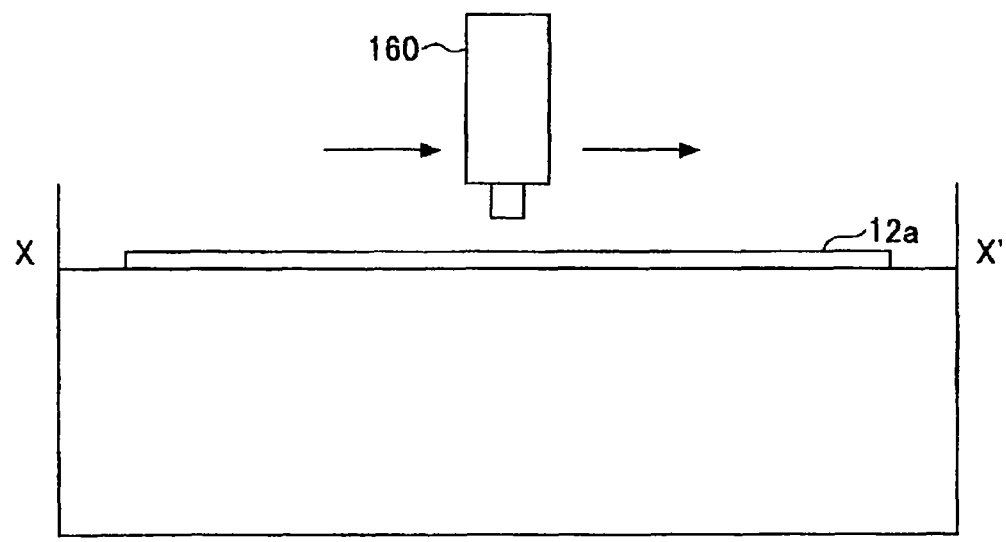

FIG. 11 shows a state where the thickness of the before-ear-removal plate glass 12a is being measured by the laser displacement gage 160. In FIG. 11, the laser displacement gage 160 is provided above the before-ear-removal plate glass 12a. Various devices can be used as the laser displacement gage 160, provided that they can measure the thickness of the before-ear-removal plate glass 12a and can recognize the thickness distribution of the before-ear-removal plate glass 12a. As shown in FIG. 11, the laser displacement gage 160 radiates laser onto the before-ear-removal plate glass 12a and detect the reflected light thereof, thereby measuring the thickness of the before-ear-removal plate glass 12a. And, since the laser displacement gage 160 moves in the breadth direction of the before-ear-removal plate glass 12a, it can measure the thickness of the plate glass 12a and recognize the elevation difference of the surface of the before-ear-removal plate glass 12a.

Figure 12:
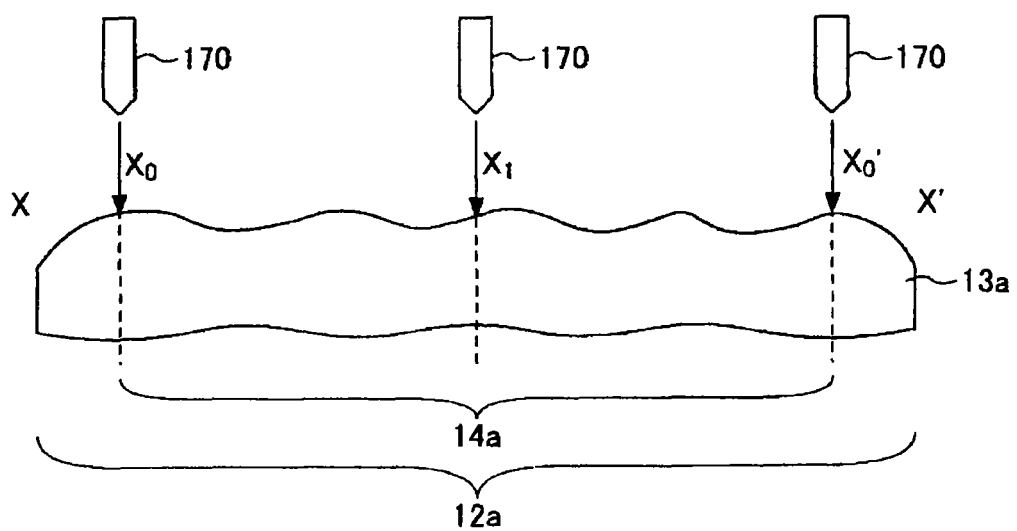

FIG. 12 shows an example of the breadth direction section structure of the surface shape of the before-ear-removal plate glass 12a measured by the laser displacement gage 160. In FIG. 12, the before-ear-removal plate glass 12a has a hubbly surface in a micron order. Here, when the before-ear-removal plate glass 12a is cut in such a manner that the raised surface portions of the before-ear-removal plate glass 12a, that is, the thickened portions thereof provide the two end portions, the substrate end portion area 21 can have a shape the elevation difference of which is 15 μm or less. In FIG. 12, the before-ear-removal plate glass 12a is cut along the lines $X_0$, $X_0'$, and the ears 13a are cut and removed, thereby manufacturing the after-ear-removal plate glass 14a. In the lines $X_0$, $X_0'$, as the cutting positions, there are selected positions which exist in the two ends of the breadth direction section shapes of the before-ear-removal plate glass 12a, more exactly, exist in the vicinity of the highest positions of the inclined portions inwardly ascending from the inclined portions greatly descending. Thus, finally, the display glass substrate 20, 20a or 20b according to the present embodiment, can be manufactured.

Here, to cut the before-ear-removal plate glass 12a, first, the portions to be cut may be scribed by the cutters 170 and then the before-ear-removal plate glass 12a may be bent at the scribed portions.

Also, in FIG. 12, the central portion is also cut at a position $X_1$ by the cutter 170. The reason for this is that, in order to manufacture two pieces of display glass substrate 20, 20a or 20b in the breadth direction, the after-ear-removal plate glass 14a is cut at the position $X_1$ in the central portion. In this case as well, as shown in FIG. 12, the raised high position $X_1$ of the surface shape of the after-ear-removed plate glass 14a is selectively cut here. This can flatten the substrate end portion areas 21 of the two pieces of cut produced display glass substrate 20, 20a or 20b and the elevation difference thereof can be set for 15 μm or less. Here, the cutting at the position $X_1$ in the central portion is carried out in the branch lines 84, 85 not in the main line. This will be described later.

Figure 13:
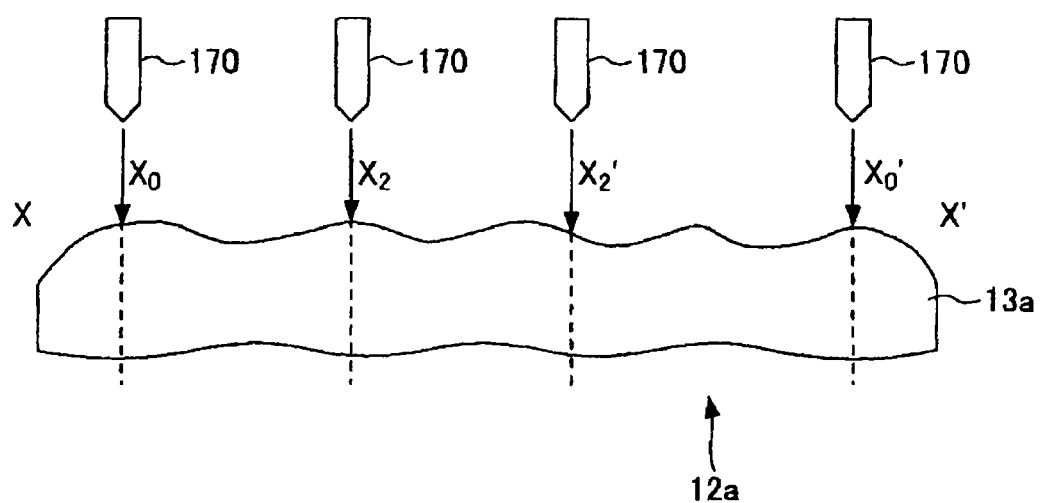
FIG. 13 shows an example of the cutting portions of the before-ear-removal plate glass 12a when the size of the display glass substrate 20, 20a or 20b be produced is reduced.

In the case that $X_1$ in the central portion does not exist at a proper position and thus the display glass substrate 20, 20a or 20b of a desired size cannot be produced, the size of the display glass substrate 20, 20a or 20b may be reduced and, as shown in FIG. 13, there may be selected portions $X_0, X_0', X_2$ and $X_2'$ where the surface of the before-ear-removal plate glass 12a capable of producing the display glass substrate 20, 20a or 20b is high. Next, the before-ear-removal plate glass 12a is cut at $X_0, X_0', X_2$ and $X_2'$. This can flatten the substrate end portion areas 21 of three pieces of cut produced display glass substrate 20, 20a or 20b and the elevation difference thereof can be set for 15 μm or less.

Thus, using the laser displacement gage 160, the breadth direction surface shape of the before-ear-removal plate glass 12a may be recognized and, cutting the two ends of the before-ear-removal plate glass 12a may be cut worked at its raised positions to reduce the elevation difference of the substrate end portion area 21, enables manufacturing of the display glass substrate 20, 20a or 20b according to the present embodiment.

Referring again to FIG. 10, the glass ribbon 11a with two ears 13a cut by the cutter 170 in the main line is guided in the branch 84 and, in the vicinity of the position $X_1$ the thickness thereof in the Y-Y' direction in the central portion of the after-ear-removal plate glass 14a, is measured again by the slash displacement gage 161. Thus, the thickness of the after-ear-removal plate glass 14a in the vicinity of the position $X_1$ in the central portion of the after-ear-removal plate glass 14a can be measured. After measured, as described above in FIG. 12, the after-ear-removal plate glass 14a is cut to two pieces in the portion where the plate thickness is sufficiently large.

Also, to cut the after-ear-removal plate glass 14a to two pieces efficiently, a further branch 85 may be provided, and the after-ear-removal plate glass 14a with its two ears 13a cut may be cut to two pieces using this branch 85 together with the branch 84. Here, provision of the branches 84 and 85 is arbitrary and, when the after-ear-removal plate glass 14a is cut to two pieces, the branches may be provided as the need arises. Also, even in the case that the after-ear-removal plate glass 14a is cut to two pieces, when the throughput can be neglected, only one of the branches 84 and 85 may be provided. Or, reversely, the throughput may be enhanced further by providing a larger number of branches 84 and 85.

As described above, according to the display glass substrate 20, 20a or 20b manufacturing method of the present embodiment, without carrying out the temperature control or the like, using the laser displacement gage 160, the display glass substrate 20, 20a or 20b according to the embodiment 1 can be manufactured easily.

Here, in the display glass substrate 20, 20a or 20b, as described above in FIG. 1, the chamfered portion 22 may also be formed as the need arises.

Also, a polishing treatment may also be carried out on the cut display glass substrate to remove the minute defects on the surface of the display glass substrate.

A polishing treatment is a process in which a urethane foam material called a polishing pad is pressed against the display glass substrate and they are moved relative to each other to polish the glass surface with cerium oxide slurry.

Since the polishing pad is softer and easier to deform than the display glass substrate, the edge portions of the display glass substrate are easier to be polished than the central portion thereof, thereby the substrate end portion area 21 can have an undesirably large elevation difference.

To reduce such elevation difference, the polishing pad may be trued such that its central portion provides a projecting shape relative to its outer peripheral portion, or the pressure of the central portion of the polishing pad may be increased over its peripheral portion when pressure is applied to it, or the relative movement amount between the glass substrate and polishing pad in the glass peripheral portion may be set smaller than that in its central portion.

When the elevation difference of the substrate end portion area 21 after cut is not 15 μm or less, a lapping treatment may also be carried out on the glass substrate to improve the elevation difference of the area 21. A lapping treatment is generally a process in which, while the glass substrate is pressed against a flat cast-iron surface table with relative low pressure, they are moved relative to each other, to the glass substrate surface with iron oxide or alumina oxide slurry.

Differently from the polishing treatment, in the lapping treatment, since the surface table is harder than the glass substrate, the flatness of the surface table is transferred to the glass substrate. This can improve the elevation difference of the substrate end portion area 21. However, comparing with the polishing treatment, flaws are caused on the surface of the glass substrate. Therefore, a polishing treatment must be carried out after the lapping treatment.

Although description has been given heretofore specifically of the preferred embodiments of the invention, the invention is not limited to the above-described embodiments but various changes and replacements can be added to the above embodiments without departing from the scope of the invention.

Although the present application has been described specifically and with reference to its specific embodiments, it is obvious to persons skilled in the art that various changes and modifications can be added thereto without departing from the spirit and scope of the invention.

The present application is based on Japanese Patent Application (Patent Application 2009-245938) filed on Oct. 26, 2009 and Japanese Patent Application (Patent Application 2010-044515) filed on Mar. 1, 2010 and thus the contents thereof are incorporated herein for reference.

INDUSTRIAL APPLICABILITY

The invention can be applied to a display glass substrate for use in a flat panel display such as a liquid crystal display panel or a plasma display panel.

DESCRIPTION OF REFERENCE NUMERALS

10: Molten glass
11, 11a: Glass ribbon
12: Plate glass
20, 20a, 20b: Display glass substrate
21: Substrate end portion area
22: Chamfered portion
30: Stage
40: Nozzle
50: Sensor
60: Resist
70: Tank furnace
80: Metal bath
81: Exit portion
82: Upstream side
83: Downstream side
84, 85: Branch 90: Molten tin
100: Heater
120: Edge roller
121: Rotation shaft
130: Layer
140: Roller conveyor
150: Glass plate manufacturing apparatus
160, 161, 162: Laser displacement gage
170: Cutter

The invention claimed is:

1. A display glass substrate, comprising:
   two main surfaces;
   four end faces; and
   at least one substrate end portion area existing in a range of about 1 mm to about 30 mm inwardly from an end face, wherein at least one of the two main surfaces comprises the substrate end portion area, such that when one of the two main surfaces is positioned horizontally, the surface of the substrate end portion area has an elevation difference of 15 μm or less as measured from a maximum height to a minimum height of the surface.

2. The display glass substrate according to claim 1, wherein the substrate end portion area is situated on a film forming surface side of the glass substrate.

3. The glass substrate according to claim 1, which is suitable in a flat panel display.

4. The glass substrate according to claim 1, further comprising a chamfered portion abutting the end face.

5. The glass substrate according to claim 1, wherein the surface of the substrate end portion area has a shape in which a substrate surface of an outer end $E_1$ is lower than a substrate surface of an inner end $E_2$.

6. The glass substrate according to claim 1, wherein the surface of the substrate end portion area has a shape in which a substrate surface of an outer end $E_1$ is higher than a substrate surface of an inner end $E_2$.

7. The glass substrate according to claim 1, wherein the surface of the substrate end portion area has a shape in which a substrate surface of an outer end $E_1$ is higher than a substrate surface of an inner end $E_2$, and a substrate surface of a central portion $E_c$ is lower than the substrate surface of the inner end $E_2$.

8. The glass substrate according to claim 1, wherein the surface of the substrate end portion has a shape in which a substrate surface of an outer end $E_1$ is lower than a substrate surface of an inner end $E_2$, and a substrate surface of a central portion $E_c$ is higher than the substrate surface of the inner end $E_2$.

9. A method for manufacturing the display glass substrate according to claim 1, the method comprising:
   (i) successively supplying a molten glass to a bath surface of molten metal to form a glass ribbon advancing on the bath surface, and heating the glass ribbon while temperatures of breadth direction end portions of the glass ribbon are higher than temperatures of a central portion of the glass ribbon;
   (ii) advancing the glass ribbon in an advancing direction, and heating the glass ribbon while temperatures of the central portion of the glass ribbon are higher than temperatures of the breadth direction end portions of the glass ribbon; and
   (iii) cutting the glass ribbon after cooling the glass ribbon in a breadth direction.

10. The method according to claim 9, wherein, when a viscosity of the molten glass is in a range of $10^{4.5}$~$10^{6.4}$ poise, the heating (i) is switched to the heating (ii).

11. The method according to claim 9, which is suitable for manufacturing a flat panel display.

12. A method for manufacturing the display glass substrate according to claim 1, the method comprising:
   (i) successively supplying a molten glass to a bath surface of molten metal to form a glass ribbon advancing on the bath surface;
   (ii) measuring a breadth direction plate thickness distribution of the glass ribbon; and
   (iii) cutting step of cutting the glass ribbon along an advancing direction based on the plate thickness distribution, such that breadth direction end portions of the glass ribbon have greater plate thicknesses than a central portion of the glass ribbon.

13. The method according to claim 12, wherein the measuring (ii) occurs with a laser displacement gage during advancing of the glass ribbon.

14. The method according to claim 12, which is suitable for manufacturing a flat panel display.

* * * * *